United States Patent [19]

de Jong

[11] 3,972,843

[45] Aug. 3, 1976

[54] EXPANDABLE STYRENE POLYMERS SUITABLE FOR THE PRODUCTION OF QUICKLY MOLDABLE CELLULAR BODIES

[75] Inventor: Rudolf de Jong, Marl, Germany

[73] Assignee: Chemische Werke Huls Aktiengesellschaft

[22] Filed: Mar. 24, 1975

[21] Appl. No.: 561,195

Related U.S. Application Data

[63] Continuation of Ser. No. 408,424, Oct. 23, 1973, abandoned.

[30] Foreign Application Priority Data

Nov. 11, 1972 Germany............................ 2255397

[52] U.S. Cl. ........................... 260/2.5 B; 260/2.5 R; 260/2.5 HB; 260/2.5 HA; 260/2.5 H; 260/33.4 PQ; 260/878 R
[51] Int. Cl.² ........................... C08J 9/18; C08J 9/20
[58] Field of Search ....................... 260/2.5 B, 2.5 R

[56] References Cited

UNITED STATES PATENTS

| 3,224,984 | 12/1965 | Roper et al. ..................... 260/2.5 B |
| 3,320,188 | 5/1967 | Dijkema............................ 260/2.5 R |
| 3,398,105 | 8/1968 | Roper et al. ..................... 260/2.5 B |
| 3,743,611 | 7/1973 | Muroi et al. ..................... 260/2.5 B |

*Primary Examiner*—Morton Foelak
*Attorney, Agent, or Firm*—Gilbert L. Wells

[57] ABSTRACT

Expandable styrene polymers suitable for the production of quickly moldable cellular bodies having reacted therein a uniformly distributed high molecular poly-1-butene which forms a discontinuous phase. The poly-1-butene includes mixed polymers of 1-butene, with 1-butene as the predominant amount and the concentration of poly-1-butene is about 0.01 to 2.0 percent by weight based on the weight of the polystyrene.

15 Claims, No Drawings

EXPANDABLE STYRENE POLYMERS SUITABLE FOR THE PRODUCTION OF QUICKLY MOLDABLE CELLULAR BODIES

This is a continuation of application Ser. No. 408,424, filed Oct. 23, 1973, now abandoned.

BACKGROUND OF THE INVENTION

The field of the invention is synthetic resins having pore forming. The present invention is particularly concerned with the production of expandable styrene polymers which, due to a small quantity of an incompatible high molecular weight compound, homogeneously dispersed throughout the styrene polymers and forming a non-continuous phase can be fabricated into quickly moldable cellular bodies.

The state of the art of foamed polystyrene, and the poly-1-butene used in the present invention may be ascertained by reference to the Kirk-Othmer "Encyclopedia of Chemical Technology", 2nd Ed., Vols. 3 (1964) under the section entitled "Butylenes", pages 830–865; 9 (1966), under the section entitled "Foamed Plastics", pages 847–884; 19 (1969), under the section entitled "Styrene Plastics", pages 85–134; and the Supplement (1971), under the section "Polymers of 1-Butene", pages 776–789, the disclosures of which are incorporated herein.

Vol. 3 of Kirk-Othmer discloses, at page 832, the nomenclature and physical properties of 1-butene, and in Table 5 on pages 850–853, the reactions of 1-butene. The Supplement volume of Kirk-Othmer discloses, in Table 11, beginning at page 786, the copolymerization of 1-butene with 1-olefins. Volume 9 discloses foamed polystyrene, particularly at pages 852 and 855, and volume 19 discloses the polystyrene foams, particularly at pages 116 through 120.

The disclosure of U.S. Pat. No. 3,503,905 of Ludwig Zuern et al which issued Mar. 31, 1970 is also incorporated herein. This patent discloses the state of the art of expanding styrene polymers in molds, styrene molding compositions which can be removed from the molds after relatively short minimum residence times, styrene polymers and copolymers containing at least 50 percent by weight of styrene units useful in the present invention, foaming agents useful in the present invention and the methods of homogeneously dispersing the poly-1-butene in the molding materials.

It is known in the prior art to produce foamable molded bodies by expanding inflatable particulate styrene polymers in molds. According to this process, particulate inflatable styrene polymers are, with the help of steam or hot gases, subjected to a pre-expansion process. The prefoamed particles are then stored and further expanded in a perforated pressure-resistant mold by means of superheated steam so that they fuse together to form a molding whose dimensions correspond to those of the mold's internal cavity. This step is known as molding. After molding, the article thus obtained is cooled in the mold. Cooling must be continued until the internal sections of the article have cooled to a temperature below the softening point of the styrene polymers. If it is removed from the mold beforehand, deformation may result. Since foam plastics are good insulators, relatively long periods are necessary to cool the moldings. The period after which the article may be removed from the mold without there being any subsequent deformation is usually called the minimum residence time. This minimum residence time, which also includes the cooling time, creates idle time which one tries to keep it as short as possible for the optimum employment of the molds.

A series of methods are known whereby the cooling periods are successfully shortened and more quickly moldable molded bodies are arrived at, for example by coating the expandable or prefoamed particles with paraffin as disclosed in British Patent No. 1,083,040 and West German Published Application No. 1,959,729, or with oil-soluble emulsifiers as disclosed in British Patent No. 1,174,749. Furthermore, quickly moldable cellular bodies may be arrived at when the expandable particles are produced in finely divided form containing a small amount of water, as disclosed in West German Published Application No. 1,719,318, or when the manufacture of the expandable particles by polymerization is undertaken in the presence of a small amount of a definite bromine compound, as disclosed in U.S. Pat. No. 3,503,905 and West German Published Application No. 1,297,327. A series of known processes carry out the polymerization in the presence of a small amount of polymer that is incompatible with the polystyrene as disclosed in West German Published Application Nos. 1,520,790; 1,769,374; 2,101,666; 1,570,238 and U.S. Pat. Nos. 2,857,339; 2,857,340; and Published Japanese Patent Application No. 71/21453, whereby, on the one hand, a shorter cooling time is observed and, on the other, however, the admixtures have practically no influence on the cooling time. Incompatible polymers disclosed in these patents are polyethylene, atactic polypropylene, polyisobutylene, polyvinylchloride, mixed polymers made up of ethylene and vinyl acetate or styrene, acrylic nitrile and N-vinyl carbazole or condensation products from phthalic acid and hexanetriol, besides elastomers such as butadiene-styrene-copolymers, polybutadiene, and polyisoprene. The compounds of high molecular weight according to the state of the art are, however, not satisfactory because they either yield insignificant inflatable particles or allow no satisfactory bonding, or do not lead to shortened cooling periods.

SUMMARY OF THE INVENTION

According to the present invention, the discovery was made that expandable styrene polymers, which contain in homogeneous distribution therein a dispersed compound of high molecular weight, previously reacted with styrene or with styrene in admixture with other comonomers, are suitable for the production of particularly quickly moldable cellular bodies wherein the compound of high molecular weight, which forms a discontinuous phase, is a 1-butene polymer of mixed polymer of 1-butene in which 1-butene is predominantly present, in amounts of from about 0.01 to 2.0 weight percent based on the weight of polystyrene. The 1-butene polymers are preferably present in amounts of from about 0.2 to 1 weight percent. When mixed polymers are used with a preponderant 1-butene content, the 1-butene portion in the mixed polymer is larger than 50 percent, especially at least 70 weight percent, and preferably 80 to 99 weight percent.

DESCRIPTION OF THE PREFERRED EMBODIMENTS

The mixed polymers according to the present invention include copolymers of 1-butene wherein the comonomers include propene, ethylene, 1-pentene, 1-hexene, higher α olefins, butadiene or styrene or terpolymers of 1-butene with ethylene and propene as comonomers, which are for example butene-propene-copolymers with a propene portion of 5 percent, 20 percent respectively, and with a RSV-value of 0.25, butene-ethylene-copolymers with an ethylene portion of 4 percent and an RSV-value of 0.5, butene-hexene-copolymers with a hexene portion of 2.5 percent and a RSV-value of 0.5, 1-butene-ethylene-propene-terpolymer with 5 percent propene and 1 percent ethylene and a RSV-value of 0.7. Generally, the RSV-value (measured in Decaline at 135°C) should be under 3, preferably under 1.5 both for the homopolymers and the mixed polymers. As homopolymers of 1-butene both partially atactic and isotactic homopolymers can be used, but preferably partially atactic homopolymers.

According to a particular embodiment, preferably the homopolymers of 1-butene can be used together with other compounds of high molecular weight, which form a discontinuous phase. The 1-butene portion should in such a case not be less than 50 percent in the combined mixture of the included compounds of high molecular weight.

As the coemployed compounds of high molcular weight the ethylene-vinylacetate-copolymers are particularly mentioned. It has been shown that by using several compounds of high molecular weight the poly-1-butene portion can be up to 50 percent, but by using the correspondingly employed copolymers the 1-butene portion is predominant in the order of magnitude from 70 percent, particularly greater than 80 percent.

The expandable foamable styrene polymers of the present invention include homopolymers and also copolymers of styrene.

The comonomers of styrene include: α-methyl styrene, ring halogenated styrene, such as 2,4-dichlorostyrene, acrylnitrile, methacrylnitrile, esters of α,β-unsaturated carboxylic acids with alcohol which contain 1 to 8 carbon atoms, such as acrylic ester and methacrylic ester and vinyl carbazole.

The styrene copolymers contain at least 50 percent by weight of styrene units.

The foamable styrene polymers advantageously contain as foaming agents liquid or gaseous organic compounds which are largely insoluble in the polymer and whose boiling point is below the polymer's softening point, e.g. aliphatic or cycloaliphatic hydrocarbons, such as propane, butane, pentane, hexane, heptane, cyclohexane, or halohydrocarbons, such as methyl chloride, dichlorodifluoromethane or 1,2,2-trifluoro-1,1,2-trichloroethane. The foamable styrene polymers may also contain mixtures of foaming agents.

If necessary, also solvents such as methanol or ethanol can be incorporated in the mixture with hydrocarbons and/or halohydrocarbons as foaming agents. The foaming agents are used advantageously in amounts of from about 3 to 15 weight percent in relation to the styrene polymer, preferably from 5 to 7 weight percent.

The expandable styrene polymers are obtained especially by suspension polymerization of the monomer styrene and, if necessary, by suspension polymerization of the comonomers in the presence of the usual activators such as peroxides, or azo-activators and dispersion stabilizers such as tricalcium phosphate, or organic colloids such as polyvinyl alcohol, polyvinyl pyrrolidone or hydroxyethyl cellulose in the presence of the foaming agents and of the 1-butene polymer and, if need be, of further compounds of high molecular weight which form a discontinuous phase. But it is also possible to produce the expandable styrene polymers, e.g. according to a mass polymerization method. Furthermore, foaming agent-free styrene polymers which already contain the compounds of high molecular weight and which were obtained in the form of granules or pearls, according to known mass polymerization methods, suspension methods respectively, in the presence of said compounds of high molecular weight, can be subsequently impregnated with the foaming agents.

The homogeneous dispersion of the poly-1-butene in the styrene polymer may, for example, be achieved by polymerizing monomeric styrene, if desired with other monomers, in the presence of an expanding agent and the 1-butene polymers. It is, however, also possible to mix the styrene polymer containing the coreacted 1-butene polymers (the polymerized reacton product from styrene and the 1-butene polymers) in the molten state with expanding agent. This may, for example be carried out in an extruder of conventional design. Care must be taken however, to ensure that the compositions are rapidly cooled immediately after they leave the nozzle so that they do not expand before comminution. Another very advantageous method of producing the molding compositions according to this invention consists in polymerizing styrene in aqueous suspension and adding the 1-butene compounds, if desired, with the expanding agent, during polymerization at a point when the polymer particles no longer divide ("particle identity point"). For example, compositions of polystyrene which contain fairly large amounts of 1-butene polymer may be advantageously dissolved in monomeric styrene followed by polymerization in the presence of a foaming agent.

In order to obtain a dispersion of the butene polymers, which is as homogeneous as possible, the polymerization is undertaken according to the prior art under intensive mechanical stirring. The particle size of the butene polymers in the styrene polymer is with such a treatment less than or equal to 20 μm. With smaller particle sizes the cooling time is shorter than with larger particle sizes. Nevertheless, the cooling time with not much larger particles is below the cooling times that occur when known additives are used. It was found that the cooling periods using equal amounts of butene polymer are shorter when the molecular weights of the styrene polymer are lower. Such a lowering of the molecular weight, expressed by the K-value, can be achieved by adding regulating agents to the polymerization, e.g. dimeric methyl styrene or tertiary dodecyl mercaptan. These regulating agents are incorporated in amounts of from about 0.05 to 0.5 weight percent, preferably from 0.1 to 0.3 weight percent in relation to the mixture of monomers and butene polymer. The expandable styrene polymers can moreover contain flameproofing agents, softeners, stabilizing agents, antistatics, dyes or fillers.

The 1-butene polymers and mixed polymers useful in the present invention have RSV-values, where RSV means reduced solution viscosity dl/g measured in decahydronaphthalene, at a concentration of 0.1 g/100 cm$^3$ at 135°C, generally of about 0.2 to 3.0 and preferably 0.25 to 0.6.

By partially atactic poly-1-butene as used in the present invention, applicant means a solubility of the poly-1-butene in boiling ether of about 50 to 98 percent by weight.

The 1-butene polymers of the present invention are homogeneously distributed in the styrene and reacted therein.

The highly molecular weight compounds used in the present invention, in combination with 1-butene are disclosed in West German Published Application Nos. 1,520,790; 1,769,344; 2,101,666; 1,570,237; and U.S. Pat. Nos. 2,857,339; 2,857,340; and published Japanese Patent Application No. 71/21453. The polymers disclosed in these patents include polyethylene, atactic polypropylene, polyisobutylene, polyvinylchloride, mixed polymers made up of ethylene and vinyl acetate or styrene, acrylic nitrile and N-vinyl carbazole or condensation products from phthalic acid and hexanetriol, besides elastomers such as butadiene-styrene-copolymers, polybutadiene and polyisoprene according to the state of the art.

EXAMPLE 1

In a reactor which is pressure-resistant and furnished with an impeller stirrer, there are 11,600 parts by weight of water and a solution of 13,700 parts by weight of styrene, 34.5 parts by weight of benzoyl peroxide, 15 parts by weight of butyl perbenzoate and 70 parts by weight of X, where X is taken from the following Table. These contents are polymerized for about 2.5 hours at 90°C with stirring and then 1900 parts by weight of a 1 percent polyvinyl alcohol solution is added and the contents are further polymerized for about 3.5 hours at the same temperature. Finally, 1370 parts by weight of pentane is added and, toward the end of this addition process, the temperature is raised to approximately 120°C and the contents are kept at the same temperature for about 4 hours while being stirred. After cooling, expandable pearls are obtained which are washed, dried and sifted to a grain size of between 1 and 2 mm. The expandable pearls are prefoamed in flowing steam to a bulk weight of 20 grams per liter, stored for 24 hours and subsequently expanded with steam in a perforated mold measuring 30×30×15 cm. Steam is fed in until a pressure of 0.9 atmospheres excess pressure is reached. This pressure is maintained for 30 seconds. The mold is opened, when the pressure has dropped to 0.05 atmospheres excess pressure. The time elapsed from the shutting off of the steam to the pressure drop to 0.05 atmospheres is registered. Finally, more cellular bodies are produced without waiting for the pressure reduction to occur. Herewith, varying short periods are recorded. In this manner, that cooling period is ascertained by which an after-inflation of the cellular body occurs. The shortest cooling period at which no after-inflation of the cellular body is henceforth indicated as residence time.

In the following Table X is the added material of high molecular weight which forms a discontinuous phase.

a – h indicate comparative examples and
i – q give examples based on the present invention

| | X | Minimum Residence time in minutes |
|---|---|---|
| (a) | without addition | 31 |
| (b) | polyisobutylene | 34 |
| (c) | ethylene-propylene-copolymer | 31 |
| (d) | polymethylmethacrylate (Mv $v$ 130,000) | 29 |
| (e) | polymethylmethacrylate (Mv $v$ 9,000) | 25 |
| (f) | condensation product from terephthalic acid and isophthalic acid (70:30) and ethylene-glycol and 2,2-dimethyl-propandiol-1,3 (50:50) | 40 |
| (g) | hard paraffin MW 730 | 33 |
| (h) | hard paraffin MW 1600 | 31 |
| (i) | partially atactic poly-1-butene, 64% ether soluble, RSV 0.5 | 8 |
| (k) | partially atactic poly-1-butene, 79% ether soluble, RSV 0.4 | 8 |
| (l) | isotactic poly-1-butene, RSV 0.82 | 17 |
| (m) | butene-propene-copolymer (5% propene), RSV 0.25 | 7 |
| (n) | butene-propene-copolymer (20% propene) RSV 0.3 | 12 |
| (o) | butene-ethylene-copolymer (4% ethylene) RSV 0.5 | 5 |
| (p) | butene-hexene-copolymer (2.5% hexene), RSV 0.5 | 5 |
| (q) | butene-ethylene-propene-terpolymer (5% propene, 1% ethylene) RSV 0.7 | 1 |

EXAMPLE 2

Example 1 (m) is repeated whereby, instead of 70 parts by weight of butene-propene-copolymer, 140 parts by weight, 28 parts by weight respectively are incorporated. Furthermore, for comparison example 1 (d) is repeated with 140 parts by weight of polymethylmethacrylate (MV 130,000). The results are comprised in the following Table:

| Additive | Minimum Residence Time in Minutes |
|---|---|
| 28 parts by weight of butene-propene-copolymer (acc. to 1(m)) | 14 |
| 70 parts by weight of butene-propene-copolymer (acc. to 1(m)) | 7 |
| 140 parts by weight of butene-propene-copolymer (acc. to 1(m)) | 8 |
| 70 parts by weight of polymethylmethacrylate (Mv $v$ 130,000) | 29 |
| 140 parts by weight of polymethylmethacrylate (Mv $v$ 130,000) | 34 |

EXAMPLE 3

Example 1(i) is repeated whereby (a) 70 parts by weight of a partially atactic poly-1-butene with 60 percent ether-soluble parts and a RSV-value of 0.5 are employed, and (b) whereby additionally the process takes place in the presence of 0.2 weight percent of a regulator, dimeric α-methyl styrene. The following minimum residence times are measured:

| | | Minimum Residence Time in minutes | K value (according to Fikentscher) of the styrene phase |
|---|---|---|---|
| (a) | 70 parts by weight of partially atactic polybutene | 8 | 63 |
| (b) | 40.1 weight percent of dimeric α-methyl styrene | 2 | 56 |

EXAMPLE 4

Example 3(a) is repeated whereby various high stirring intensities are used. The minimum residence periods with various large polybutene particles are measured:

| Particle size of the partially atactic polybutene (discont. phase) in um | Minimum Residence time in minutes |
|---|---|
| ≤ 20 | 19 |
| ≤ 9 | 10 |
| ≤ 3 | 5 |

EXAMPLE 5

Example 3(a) is repeated whereby, instead of 70 parts by weight of the partially atactic poly-1-butene with 60 percent ether-soluble parts and a RSV-value of 0.5, 35 parts by weight and, besides, 35 parts by weight of an ethylene-vinylacetate-copolymer with approximately 45 percent vinylacetate and a melting index of about 2 are employed. The measured minimum residence period is 13 minutes.

I claim:

1. In a particulate molding composition for the production of foamed articles consisting essentially of a mixture of an expanding agent and a polymerized styrene monomer or styrene monomer in admixture with comonomers, the improvement comprising said composition containing 0.01 to 2.0 percent by weight based on said monomers and comonomers of a 1-butene polymer.

2. The particulate molding composition of claim 1, wherein said comonomers are selected from the group consisting of α-methylstyrene, ring halogenated styrene, acrylnitrile, methacrylnitrile, vinyl carbazole, and esters of α,β-unsaturated carboxylic acids and alcohols with 1 to 8 carbon atoms.

3. The particulate molding composition of claim 1, wherein said polymerized reaction product contains at least 50 percent by weight styrene units.

4. The particulate molding composition of claim 1, wherein said comonomers are selected from the group consisting of α-methylstyrene, ring halogenated styrene, acrylnitrile, methacrylnitrile, vinyl carbazole, and esters of α,β-unsaturated carboxylic acids and alcohols with 1 to 8 carbon atoms.

5. The particulate molding composition of claim 1, wherein said polymerized reaction product contains at least 50 percent by weight styrene units.

6. The particulate molding composition of claim 1, wherein said 1-butene polymer is a mixed polymer of 1-butene having a concentration of at least 70 percent by weight with a comonomer selected from the group consisting of propene, ethylene, 1-pentene, 1-hexene, butadiene and styrene.

7. In a particulate molding composition for the production of foamed articles consisting essentially of a mixture of an expanding agent, a polymerized styrene monomer or styrene monomer in admixture with comonomers and an incompatible high molecular weight compound forming a discontinuous phase and selected from the group consisting of polyethylene, atactic polypropylene, polyisobutylene, polyvinylchloride, mixed polymers of ethylene and vinylacetate, mixed polymers of ethylene and styrene, mixed polymers of ethylene and acrylic nitrile, mixed polymers of ethylene and N-vinyl carbazole, condensation products of phthalic acid and hexanetriol, butadiene-styrene copolymers, polybutadiene and polyisoprene, the improvement comprising said composition containing 0.01 to 2.0 percent by weight based on said monomers and comonomers of a 1-butene polymer and said 1-butene polymer is at least 50 percent by weight of said incompatible high molecular weight compound.

8. The particulate molding composition of claim 7, wherein said incompatible high molecular weight compound is an ethylene-vinylacetate-copolymer.

9. The particulate molding composition of claim 7, wherein said 1-butene polymer is a mixed polymer of 1-butene having a concentration of at least 70 percent by weight with a comonomer selected from the group consisting of propene, ethylene, 1-pentene, 1-hexene, butadiene and styrene.

10. The particulate molding composition of claim 1, wherein said 1-butene polymer has a solubility in boiling ether of about 50 to 98 percent by weight and a reduced specific viscosity of about 0.2 to 3.0 dl/g measured in decahydronaphthalene.

11. The particulate molding composition of claim 7, wherein said 1-butene polymer has a solubility in boiling ether of about 50 to 98 percent by weight and a reduced specific viscosity of about 0.2 to 3.0 dl/g measured in decahydronaphthalene.

12. The method of claim 1 wherein said 1-butene polymer has a solubility in boiling ether of about 50 to 98 percent by weight and a reduced specific viscosity of about 0.2 to 3.0 dl/g measured in decahydronaphthalene.

13. In the method for producing particulate molding compositions for the production of foamed articles by polymerizing styrene monomer in aqueous suspension under intensive mechanical stirring in the presence of an expanding agent and in the presence of a water-insoluble high molecular weight compound which is soluble in the styrene monomer and forms a discontinuous phase with the polymer produced, the improvement comprising as said high molecular weight compound a 1-butene polymer having a concentration of 0.01 to 2.0 percent by weight based on the styrene.

14. The method of claim 1, wherein said 1-butene polymer is a mixed polymer having a 1-butene concentration of at least 70 percent by weight.

15. The method of claim 1, wherein said 1-butene polymer is at least 50 percent by weight of said high molecular weight compound.

* * * * *